United States Patent
Graupner et al.

(10) Patent No.: US 7,072,960 B2
(45) Date of Patent: ***Jul. 4, 2006

(54) GENERATING AUTOMATED MAPPINGS OF SERVICE DEMANDS TO SERVER CAPACITIES IN A DISTRIBUTED COMPUTER SYSTEM

(75) Inventors: Sven Graupner, Mountain View, CA (US); Vadim Kotov, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 702 days.

This patent is subject to a terminal disclaimer.

(21) Appl. No.: 10/164,554

(22) Filed: Jun. 10, 2002

(65) Prior Publication Data

US 2003/0236822 A1 Dec. 25, 2003

(51) Int. Cl.
G06F 15/173 (2006.01)
(52) U.S. Cl. .................................... 709/223
(58) Field of Classification Search ........ 709/217–226, 709/238–244; 715/733–747; 707/100–104.1; 719/311–316; 370/351–430
See application file for complete search history.

(56) References Cited

U.S. PATENT DOCUMENTS

| | | | | |
|---|---|---|---|---|
| 5,414,812 A | * | 5/1995 | Filip et al. | 707/103 R |
| 5,764,740 A | * | 6/1998 | Holender | 379/112.05 |
| 5,889,956 A | * | 3/1999 | Hauser et al. | 709/226 |
| 5,930,156 A | * | 7/1999 | Kennedy | 703/6 |
| 6,047,320 A | * | 4/2000 | Tezuka et al. | 709/223 |
| 6,085,238 A | * | 7/2000 | Yuasa et al. | 709/223 |
| 6,138,122 A | * | 10/2000 | Smith et al. | 707/103 R |
| 6,141,680 A | * | 10/2000 | Cucchiara | 709/201 |
| 6,154,787 A | * | 11/2000 | Urevig et al. | 710/8 |
| 6,163,544 A | * | 12/2000 | Andersson et al. | 370/422 |
| 6,182,136 B1 | * | 1/2001 | Ramanathan et al. | 709/224 |
| 6,272,544 B1 | * | 8/2001 | Mullen | 709/226 |
| 6,289,488 B1 | * | 9/2001 | Dave et al. | 716/1 |
| 6,304,639 B1 | * | 10/2001 | Malomsoky et al. | 379/112.04 |
| 6,336,138 B1 | * | 1/2002 | Caswell et al. | 709/223 |
| 6,516,350 B1 | * | 2/2003 | Lumelsky et al. | 709/226 |
| 6,523,036 B1 | * | 2/2003 | Hickman et al. | 707/10 |
| 6,571,283 B1 | * | 5/2003 | Smorodinsky | 709/220 |
| 6,628,304 B1 | * | 9/2003 | Mitchell et al. | 715/734 |
| 6,643,699 B1 | * | 11/2003 | Liver | 709/226 |
| 6,687,735 B1 | * | 2/2004 | Logston et al. | 709/203 |
| 6,732,170 B1 | * | 5/2004 | Miyake et al. | 709/223 |
| 6,763,326 B1 | * | 7/2004 | Watkins et al. | 703/21 |
| 6,795,798 B1 | * | 9/2004 | Eryurek et al. | 702/188 |
| 6,819,668 B1 | * | 11/2004 | Hackett et al. | 370/360 |

(Continued)

OTHER PUBLICATIONS

Graupner et al.; A framework for Analyzing and Organizing Complex Systems, Feb. 6, 2001, HP Laboratories, Palo Alto, TX.*

(Continued)

*Primary Examiner*—David Wiley
*Assistant Examiner*—Joseph E. Avellino
(74) *Attorney, Agent, or Firm*—Richard P. Lange

(57) ABSTRACT

A method for generating automated mappings of service demands to server capacities in a distributed computer system, including a plurality of server and service nodes. The method establishing server model layer and a service model layer and a set of server and service attribute values, which are associated with the plurality of server and service nodes. Each set of server attributes values and service attributes values are normalized and a mapping of service nodes onto server nodes is generated.

25 Claims, 8 Drawing Sheets

U.S. PATENT DOCUMENTS

| | | | |
|---|---|---|---|
| 6,950,849 B1* | 9/2005 | Brandstatter | 709/203 |
| 6,973,622 B1* | 12/2005 | Rappaport et al. | 715/735 |
| 2001/0039581 A1* | 11/2001 | Deng et al. | 709/226 |
| 2002/0046286 A1* | 4/2002 | Caldwell et al. | 709/229 |
| 2002/0103631 A1* | 8/2002 | Feldmann et al. | 703/22 |
| 2002/0174207 A1* | 11/2002 | Battou | 709/223 |
| 2002/0198995 A1* | 12/2002 | Liu et al. | 709/226 |
| 2003/0005119 A1* | 1/2003 | Mercier et al. | 709/225 |
| 2003/0028642 A1* | 2/2003 | Agarwal et al. | 709/226 |
| 2003/0051236 A1* | 3/2003 | Pace et al. | 717/177 |
| 2003/0084156 A1* | 5/2003 | Graupner et al. | 709/226 |
| 2003/0084157 A1 | 5/2003 | Graupner et al. | |
| 2003/0101223 A1* | 5/2003 | Pace et al. | 709/206 |
| 2003/0225549 A1* | 12/2003 | Shay et al. | 702/182 |
| 2003/0236822 A1* | 12/2003 | Graupner et al. | 709/203 |
| 2004/0017783 A1* | 1/2004 | Szentesi et al. | 370/256 |
| 2004/0073673 A1* | 4/2004 | Santos et al. | 709/226 |
| 2004/0139085 A1* | 7/2004 | Eryurek et al. | 707/100 |
| 2005/0021513 A1* | 1/2005 | Vedula et al. | 707/3 |
| 2005/0102538 A1* | 5/2005 | Hunt et al. | 713/201 |

OTHER PUBLICATIONS

DeTurck et al; Design and Implementation of a Generic Connection Management and SLA monitoring Platform Supporting the VPN service; IEEE © 2001.*

Graupner, S. et al., "A Framework for Analyzing and Organizing Complex Systems", HP Laboratories Palo Alto, HPL-2001-24, Feb. 6, 2001.

Kotov, V., "Communicating Structures for Modeling Large-Scale Systems", Proc. of the 1998 Winter Simulation Conference.

Kotov, V. et al., "CSL: Communicating Structures Library for Systems Modeling and Analysis", HPL-98-118, Jun., 1998.

Kotov, V. et al., "Optimization of E-Service Solutions with the Systems of Servers Library", HP Laboratories Palo Alto, HPL-2000-54, Apr. 2000.

Mansouri-Samani, M., "Monitoring of Distributed Systems", Univ. of London Imperial College of Science, Technology and Medicine Dept. of Computing, Dec. 1995, Abstract only.

Martin-Flatin, J. et al., "A Survey of Distributed Enterprise Network and Systems Management Paradigms", Journal of Network and Systems Management, Sep. 26, 1999.

Oleson, V. et al., "Operational Information Systems—An Example from the Airline Industry", downloaded Oct. 31, 2005.

Sahai, A. et al., "Managing Next Generation E-Services", HP Laboratories Palo Alto, HPL-2000-120, Sep. 21, 2000.

Distributed Management Task Force, http://www.dmtf.org/standards/documents/WBEM/CIM_XML_Mapping20.html, downloaded Oct. 31, 2005.

HP Management Software, http://www.openview.hp.com/, downloaded Oct. 28, 2005.

Svend Graupner, "A framework for anylizing and organizing complex systems", May 9, 2001, pp. 1-18 XP002352483, www.hpl.hp.cp,/techreports/2001/hpl-2001-24.pdf.

Svend Graupner, "A framework for anylizing and organizing complex systems", May 9, 2001, pp. 1-16 XP070547878, pp. 155-165.

* cited by examiner $$I_p = \begin{pmatrix} f_p1() \\ f_p2() \\ f_p3() \\ f_p4() \\ \ldots \end{pmatrix} \quad I_s = \begin{pmatrix} v_s1 \\ v_s2 \\ v_s3 \\ v_s4 \\ \ldots \end{pmatrix} \quad I_t = \begin{pmatrix} - & - & - & - \\ f_{t11}() & - & - & - \\ f_{t21}() & f_{t22}() & - & - \\ f_{t31}() & f_{t32}() & f_{t33}() & - \\ \ldots & \ldots & \ldots & \ldots \end{pmatrix}$$

590

GENERATING AUTOMATED MAPPINGS OF SERVICE DEMANDS TO SERVER CAPACITIES IN A DISTRIBUTED COMPUTER SYSTEM

RELATED APPLICATIONS

This application is related to the following U.S. patent applications:

"REPRESENTING CAPACITIES AND DEMANDS IN A LAYERED COMPUTING ENVIRONMENT USING NORMALIZED VALUES," by Sven Graupner et al. filed on Oct. 26, 2001, application Ser. No. 10/044,882;

"METHOD AND FRAMEWORK FOR GENERATING AN OPTIMIZED DEPLOYMENT OF SOFTWARE APPLICATIONS IN A DISTRIBUTED COMPUTING ENVIRONMENT USING LAYERED MODEL DESCRIPTIONS OF SERVICES AND SERVERS," by Sven Graupner et al. filed on Oct. 26, 2001, application Ser. No. 10/046,516; and "TAILORABLE OPTIMIZATION USING MODEL DESCRIPTIONS OF SERVICES AND SERVERS IN A COMPUTING ENVIRONMENT," by Sven Graupner et al. filed on Oct. 26, 2001, application Ser. No. 10/046,519.

FIELD OF THE INVENTION

This invention relates generally to a distributed computer system, and more particularly to mapping service demand onto service capacity in a distributed computer system.

BACKGROUND OF THE INVENTION

Some large-scale software applications are distributed in order to make efficient use of the computing power available in multiple computer systems. Not only are complex software applications distributed across multiple systems, but also the computer systems may be distributed between multiple data centers. The distances that separate data centers may range from city-to-city, country-to-country, or even continent-to continent, depending on the application desires. Not only may an application be distributed between data centers, but the services provided by a software application may also be distributed between data centers.

Within a data center, various computing systems ("servers") may be interconnected to form clusters that are dedicated to performing one or more tasks associated with one or more software applications. The number of servers in a cluster may be selected as a function of the anticipated computing desires of the software application and the computing capacity of the servers.

Deploying a distributed application in a large-scale computing environment is a complex task. Network management systems can measure and analyze system traffic. However, it is difficult to associate the measured traffic with individual applications in such large-scale environments. The process of selecting which services should be provided by which data centers, which servers should be clustered, and which tasks should be performed by which clusters includes significant analysis of the computing demands of the application and the capacities of both the hardware and software. Furthermore, the software itself may be configurable to be more responsive to users. For example, application tasks are assigned to application processes, and each process may have a certain capacity for processing tasks, such as thread count.

Metrics traditionally used in system management usually refer to utilization or individual machine parameters such as central processing unit (CPU) and storage, however, these parameters are difficult to correlate with distributed applications. Current system management approaches have weaknesses in deriving information from their information bases to provide higher-level perspectives for the behavior of large-scale distributed systems.

SUMMARY OF THE INVENTION

In one embodiment, the invention may include a method for generating automated mappings of service demands to server capacities in a distributed computer system, including a plurality of server and service nodes is described. The method establishes at least one server model layer, and at least one service model layer. The server model layer and the service model layer includes a set of server attribute values and service attribute values associated with the plurality of service and server nodes. Each set of server attributes values and service attributes values are normalized. The normalized capacity attribute values and normalized demand attribute values are used to generate a mapping of service nodes onto server nodes.

In another embodiment, the invention may include a method for allocating computing resources in a distributed computer system having a plurality of computing machines that host a plurality of application processes. The method comprises establishing at least one server model description and at least one service model description. The server model description includes data structures which further includes a set of server attribute values for the plurality of server nodes, and the service model description which further includes data structures which further includes a set of service attribute values for the plurality of service nodes. Each of the associated sets of service and server attribute values are normalizing by generating at least one value for each service and server attribute value. The normalized capacity attribute values and normalized demand attribute values are used to generate a mapping of service nodes onto server nodes.

In yet another embodiment, the invention may include an apparatus for optimizing allocation of computer resources. The apparatus comprises a server modeling means and service modeling means for generating a plurality of server and service nodes, wherein each of the plurality of server and service nodes has an associated set of server and service attribute values. The associated sets of server and service attribute values are normalized by a normalizing means. The normalizing means generates at least one normalized value for each server and service attribute value, such that the normalized values describe predetermined relationships between the plurality of server and service nodes. The normalized server and service attribute values are optimized in accordance with an objective function and optimization function. A mapping means generates an optimized mapping of the demand model onto the capacity model.

BRIEF DESCRIPTION OF THE DRAWINGS

The invention is illustrated by way of example and not limitation in the accompanying figures in which like numeral references refer to like elements, and wherein.

DETAILED DESCRIPTION OF A PREFERRED EMBODIMENT

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

The invention may be specially constructed for desired purposes or it may comprise a general-purpose computer as selectively activated or reconfigured by a computer program stored in the computer. The algorithms presented herein are not inherently related to a particular computer system or other apparatus. In particular, various general-purpose computer systems may be used with computer programs written in accordance with the teachings of the invention, or it may prove more convenient to construct more specialized apparatus to perform the method steps described below. The structure for such machines will be apparent from the description given below.

According to an embodiment of the invention, a system of measuring and simulating the behavior of distributed computer environment may involve viewing a large-scale computer system in terms of various sub-systems, which may include a plurality of model layers. These model layers are categorized in terms of resource demands and available capacities. According to an embodiment of the invention, each model layer may be illustrated in terms of a model description, which is an illustration of the topography of the model layer. Matches for pairs of neighbored model descriptions for resource demands with model descriptions of capacity are generated using an optimization algorithm. Based on the optimized model descriptions, the placement of services, distributed applications, and applications tasks can be analyzed and an optimizing mapping of resource demands and available capacity can be generated.

Figure 1:
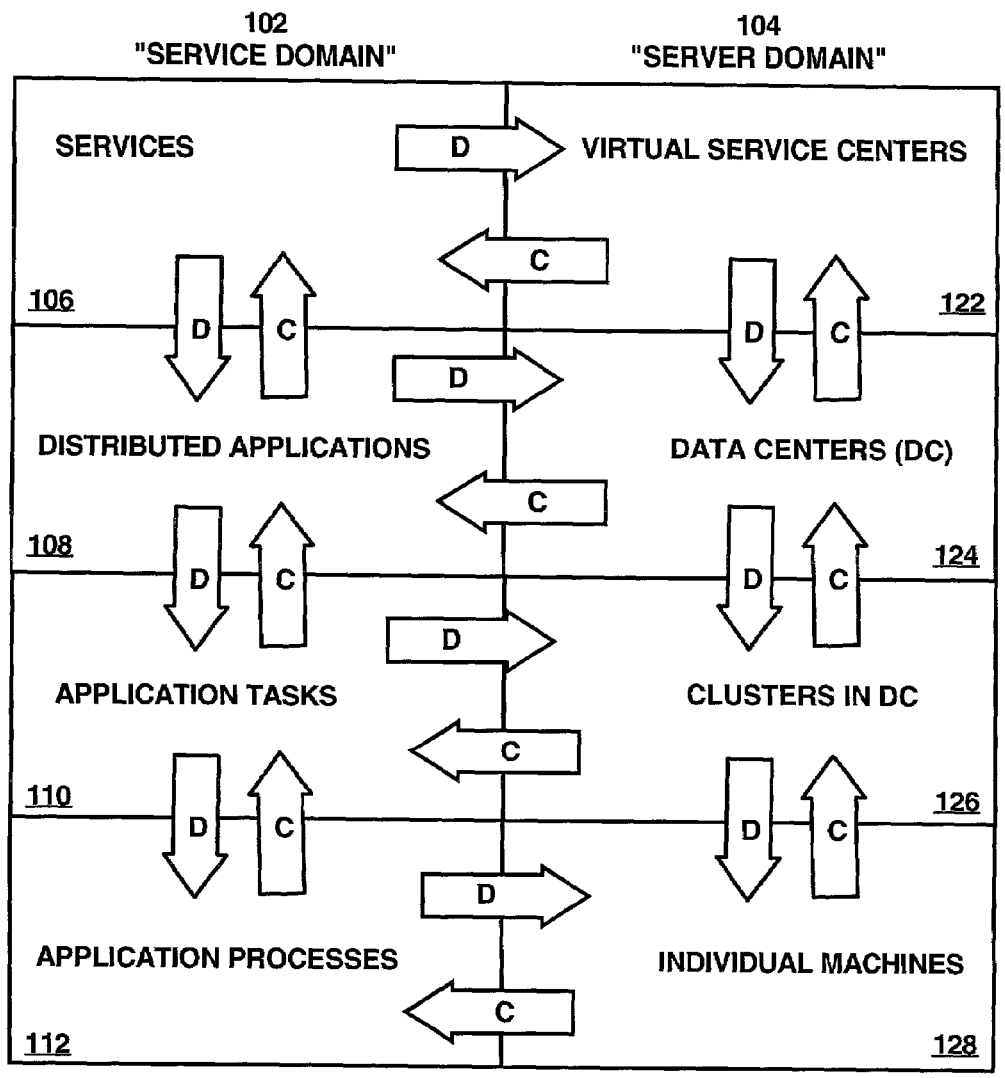
FIG. 1 illustrates a block diagram of capacity and demand relationships between the services and server demands layers, according to an embodiment of the invention.

FIG. 1 illustrates a block diagram of the capacity and demand relationships between model layers that may include the software and hardware in a distributed computing environment. The model layers are classified into two domains, a service domain 102 and a server domain 104. Service domain 102 includes model layers that may include the services provided by software application(s) and software module(s). Server domain 104 includes model layers that may include hardware that executes the software applications and modules in the service domain. Both the service domain 102 and the server domain 104 includes a plurality of model layers 106, 108, 110, 112, 122, 124, 126 and 128. The model layers 106, 108, 110, 112, 122, 124, 126 and 128 are illustrated in a vertical hierarchy from the highest level to the lowest level. For example, in the server domain 104, the virtual service center 122 is the highest-level model layer in terms of its operation and the individual machine 128 layer is lowest (or most basic). These model layers 106, 108, 110, 112, 122, 124, 126 and 128 can be correlated with neighboring layer of the other domain or within one layer of the same domain in terms of offering capacity and requesting demand in order to generate a mapping of services and servers.

Services model layer 106 is the highest layer in the service domain 102. The services model layer 106 may include sets of distributed applications that cooperate to accomplish one or more application tasks. The distributed applications model layer 108 may include sets of application tasks that are performed at different geographic locations. Application tasks model layer 110 may include application tasks that are assigned to individual locations, with each task representing a share of an application that is performed at the location. "Location" includes host machines ("servers") or environments to which applications or tasks are assigned. A "server" includes a platform that is capable of hosting services. Examples of servers are machines, as well as clusters of machines, located at different places and coupled to form one logical environment to host all the software of a service. Application processes model layer 112 may include locations of the application processes.

Virtual service centers model layer 122 is the highest layer in the server domain 104. The virtual service centers model layer 122 may include sets of service centers that are available to cooperatively perform one or more services. The virtual service centers model layer 122 are representatives for execution environments assigned to sets of services located in several, distributed data centers. The data centers model layer 124 may include physical location of machines and equipment. The clusters model layer 126 may include sets of servers that are interconnected and available to cooperatively perform selected application tasks. Finally, the individual machines model layer 128 may include the individual servers present in the computing environment.

Model layers 108, 110, 112, 122, 124, 126, and 128 include a model description which illustrate the topology of the particular model layer, (the model description will be discussed in greater detail with regards to FIG. 2) that are characterized by capacity attributes. This is illustrated in the figure as the plurality of directional arrows labeled "C". The capacity includes the computing resources that are available to be assigned between model layers in the same domain or among adjacent model layers in different domains. For example, the model layer clusters in data center (DC) 126 have capacities that can be assigned to the application tasks model layer 110 and to the data centers model layer 124. The capacity can be distributed among service domain 104 and vertically resolved between model layers the server domain 102. The capacity attributes in the services model layer 106 is not further taken into account since there is no higher-level model to which the services are to provide a capacity.

Model layers 106, 108, 110, 112, 122, 124, and 126 include a model description which illustrates the topology of a particular model layer, (the model description will be discussed in greater detail with regards to FIG. 2) that is characterized by demand attributes. This feature is illustrated in FIG. 1 as the plurality of directional arrows labeled "D". The demand includes a quantity of a computing resource needed to perform an associated function. The demand may be assigned to adjacent model layers in the server domain 102 and among adjacent model layers in the service 104 domain. For example, cluster model layer 126 has a certain quantity of processing demand, which can be satisfied by the demand distributed by the data center (DC) model layer 124 and application tasks 110. The demand attribute in the services model layer 128 is not further taken into account since there is no higher-level model to which capacity can be assigned to the server component.

According to an embodiment of the invention, the capacities and demands of the components in the plurality of model layers 106, 108, 110, 112, 122, 124, 126 and 128 are correlated both within a domain and from one domain to another. This is illustrated in the figure by the plurality of "C" and "D" arrows pointing in a horizontal direction. For example, within the service domain 102, the demand by the services layer 106 is correlated with the capacity available from the distributed applications layer 108. From the service domain 102 to the server domain 104, the demand of the distributed applications layer 108 is correlated with the capacity available from the data centers layer 124. The correlation of the demands and capacities of the components within and between the domains enables an optimal organization for a complex software and hardware-computing environment.

Since congestion may occur at any layer and thereby degrade the overall system performance, it would be desirable to estimate the level of demand for computing resources and correlate the level of demand with the available capacity, both from model layers in the service domain 104 to the model layers in the server domain 102 and between model layers within the service domain 104 and between model layers within the server domain 102.

In order to determine the optimal mapping for the capacity and demand between model layers, the model layers may be described in terms of model descriptions. Based on these model descriptions, the placement of services, distributed applications and application tasks can be analyzed and optimized.

Figure 2:
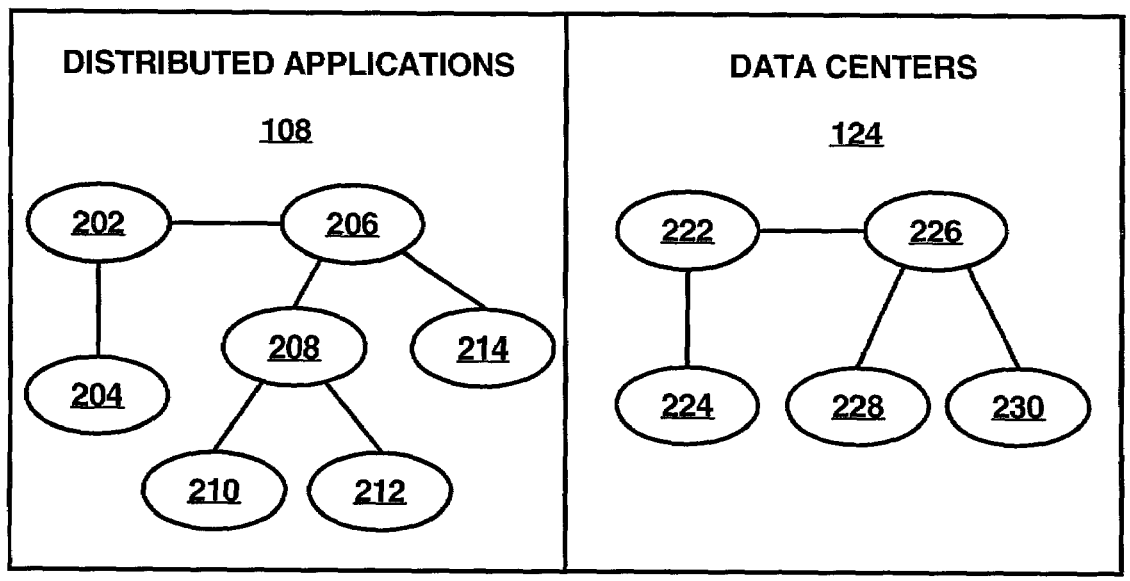
FIG. 2 illustrates a block diagram of exemplary model descriptions within the service and server domains, according to an embodiment of the invention.

FIG. 2 illustrates a block diagram of exemplary model descriptions within the service 102 and server domains 104. The model descriptions are employed to illustrate the topology of a particular model layer. The model layers 106, 108, 110, 112, 122, 124, 126 and 128 in the services domain 102 and the server domain 104 can be illustrated in terms of model descriptions. The model layers in the service domain 102 are illustrated by the service model descriptions. The model layers in the server domain are illustrated by the server model descriptions. The common abstractions used in generating model descriptions are based on queuing theory and process-oriented, dynamic traffic modeling, and further enhanced by mechanisms that express demands and capacities.

The model description illustrates the structure of the model layer. Model descriptions illustrate a topology of constituent nodes. Nodes are data structures, which illustrate the constituent elements of the individual model layer. The nodes may be viewed as an extension of the model descriptions. Nodes may be connected via links. Links connecting nodes illustrate relationships between the nodes. For example, nodes 202–212 illustrate the organization of the distributed application 108 model layer, and the nodes 222–230 illustrate the organization of the data center model layer 124. Each node may illustrate an individual application. For example, the links illustrated in FIG. 2 represent communications channels that connect the nodes. Depending on user needs, links may illustrate physical network capacity, network activity among servers, or communication activity among services. The model layers 106, 108, 110, 112, 122, 124, 126 and 128 in both the service domain 102 and the server domain 104 can be described in terms of nodes representing the individual model layer. The model layers for the service domain 102 can be illustrated in terms of a plurality of service nodes, and the model layers for the server domain 104 can be described in terms of a plurality of server nodes. The nodes and links may be seen as data structures, which illustrate the demand and capacity relationships in a compact format.

In FIG. 2, the ellipses 202–214 and 222–230 represent nodes in the distributed applications 108 and data center 124 models layers, respectively. For example, the distributed applications model includes nodes 202, 204, 206, 208, 210, 212, and 214 that communicatively are related as shown by the links. The data center model includes nodes 222, 224, 226, 228, and 230, with each node representing a particular data center. The lines that link the nodes 202–214 and 222–230 represent communication relationships between the nodes.

A model description also expresses parameters values which represent numerical characteristics of the nodes. For example, the parameters values may be either fixed or variable and pertain to metrics such as throughput, processing capacity, and transmission times or variable, dynamic parameters. These parameters values may be associated with a specific node or group of nodes.

Hierarchical relationships between the nodes are also expressed in the model description. For example, parent and child relationships are expressed in the model description. Also, the model description describes the elements that are used as input data in a simulation engine (not shown) for purposes of prediction or evaluation of possible deployment solutions. The simulation engine (not shown) may be discrete and event-based.

In one embodiment of the invention, the model descriptions may be illustrated in a Lisp-like hierarchical input language. In another embodiment of the invention, XML representations are generated and are used for external access and processing of those descriptions. In an example, the layered relationships between the model descriptions are accomplished by recursively defining the layered relationships using the features of the selected language. These representations are interpreted by a model interpreter, which is well known in the art.

In one embodiment of the invention, nodes may also have associated resource demand and available capacities. A nodes associated resource demand and available capacity may be represented by a vector or matrices describing demand and capacity for certain parameters. Parameters for capacity are classified into at least three dimensions: processing capacity, storage capacity and transport capacity. Processing capacity is a measure for the capability to process a quantum of requests, jobs or tasks per time unit. Storage capacity is an amount offered to store a quantum of data. Transport capacity is the capacity available between servicing stations in terms of transferable data units per time. Parameters for demand are classified into at least three dimensions: processing demand, storage demand and transport demand. The processing demand is defined in terms of requests or tasks per time unit initiated by an application in a service. The storage demand is the storage wanted by applications or services. The transport demand is the communication element between applications or services as data units per time. The links are represented by transport capacities or communication demands among the nodes.

All the parameters for processing, storage and transport capacities and demands may be expressed relatively to chosen base units. Individual parameters may be multiples or fractions of the respective base units. These "normalized" parameters illustrate a consolidated summary of demand and capacity in a compact format. For example, instead of characterizing one machine node with a processing capacity of four CPU's of type IA64 and another machine with sixteen CPU's of type PA850, one of the platforms is assigned the processing capacity of 1.0 (=base unit). The capacity of the other platform is then expressed relative to this base unit. If one IA64 CPU has the processing capacity of two PA850 CPU's, and the four-CPU IA64 machine is chosen as base unit, the resulting processing capacities for both machines would be 1.0 for the IA64 machine and 2.0 for the PA850 machine. In an embodiment of the invention, in order to correlate two different model layer descriptions, correlation factors (not shown) may be used to translate demands and capacities expressed within one model layer into the demands and capacities of the other layer.

Figures 3A, 3B:
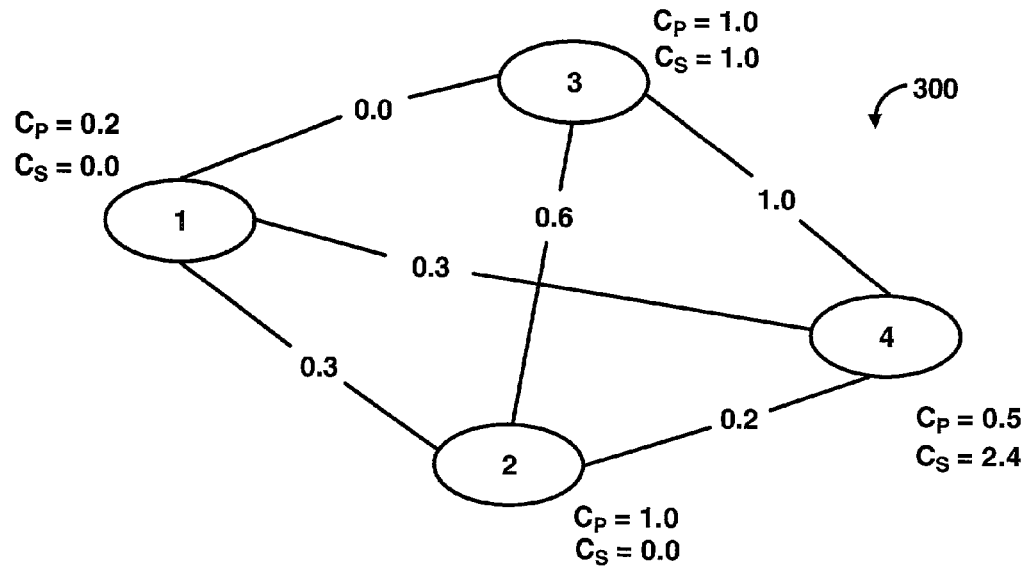
FIG. 3A illustrates an exemplary capacity model description, according to an embodiment of the invention.
FIG. 3B illustrates an example of normalized capacity vectors and matrices that characterize the simple capacity model shown in FIG. 3A, according to an embodiment of the invention.

FIG. 3A illustrates an example of a capacity model description 300. Model description 300 includes nodes 1–4. It can be appreciated by one of ordinary skill, that more or fewer nodes may be defined. Each node has associated therewith normalized capacity attributes, $c_p$ and $c_s$, for processing and storage, respectively. Capacity attribute $c_p$ describes a number of work units (e.g., requests, jobs or tasks) per unit time. Capacity attribute $c_s$ describes a quantity of storage available for a selected unit of data. The relationship between the nodes may be expressed via a transport capacity matrix $C_t$. The capacity attributes are expressed in terms of normalized parameters as explained below. It will be appreciated by one of ordinary skill that nodes 1–4 may also have associated demand attributes.

The links that connect the nodes represent transport capacities $C_t$ between the nodes, and the values associated with the lines illustrate the normalized transport capacities $C_t$. For example, the transport capacity between nodes 1 and 4 is 0.3, which represents data units per unit of time. While not shown, it will be appreciated that there are transport demand values that are also associated with the lines. A transport capacity value of 0.0 indicates that there is no communication between the nodes.

FIG. 3B illustrates the vectors 320 and 330 and capacity matrix 340 that characterize the capacity model layer 300 of FIG. 3A. Capacity and demand vectors 320, 330 and capacity matrix 340 represent the capacity attributes of the nodes in the model description. The capacity matrix 340 illustrates the capacity relationship between nodes in the particular model layer. For brevity, FIG. 3B illustrates only the capacity vectors and matrix. One of ordinary skill can appreciate that the demand matrix may be constructed in an analogous manner to the capacity matrix 340.

The example model employs vectors to represent the $c_p$ 320 and $c_s$ 330 attributes of the nodes in the model and a matrix 340 to represent the transport capacity attribute $C_t$.

The $C_p$ vector 320 contains the normalized processing capacity attribute values, and the $C_s$ vector 330 contains the normalized storage capacity attribute values. The transport capacity attribute $C_t$ matrix 340 contains the normalized results of a matrix addition between the $C_p$ and $C_s$. The demand attributes can be illustrated with vectors $D_p$ and $D_s$ (not shown) and matrix $D_t$ (not shown).

The first element in $C_p$ 320 indicates that node 1 has a processing capacity of 0.2 or 20% of the selected base processing capacity. Nodes 2 and 3 each have processing capacities of 1.0, which is the base capacity. Node 4 has a processing capacity of 50% of the base capacity. Respective storage capacities are shown in vector $C_s$ 330.

The transport capacities between nodes are indicated in matrix $C_t$ 340. For example, the transport capacity between node 1 and node 2 is 0.3, or 30% of the selected base capacity. Even though only the cells at column j, row i (for i>1 and i not equal to j) are populated with attribute values, it will be appreciated that cells at row j, column i (i<4 and i not equal to j), could also or alternatively be populated with the appropriate capacity values.

In addition to normalizing demand and capacity parameters, constraints may also be mapped into normalized parameters. For example, constraints may indicate a degree of compatibility between servers and services. There may be services that cannot be installed in certain data centers (offering capacity) due to a competitive situation, legal reasons, and security or licensing issues. An example of preferences may be services that may be installed in certain data centers due to a competitive situation. Also, constraints may involve non-technical economic considerations. For example, the cost of allocating capacity to a particular data center may be prohibitive.

The constraints, which indicate a degree of compatibility between nodes are called "affinity" constraints. Affinity constraints are a predetermined range of values. Affinity constraints consist of hard, soft and neutral constraints. "Hard" constraints are an absolute affinity or absolute repulsion, and are the extreme values of the range. These constraints should be adhered to. Soft constraints are the values that exist between the hard constraints. And the neutral value, which is typically the mean value in the range, indicates a default value.

Accordingly, the constraints have to be uniformly represented or "normalized" when determining optimal mappings. The method of normalizing attributes and preferences is explained in further detail with regard to FIGS. 4A and 4B.

Figure 4A:
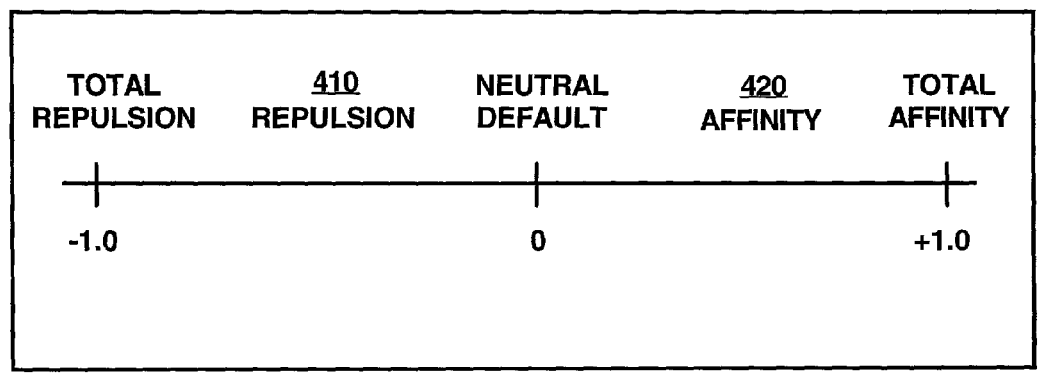
FIG. 4A illustrates a normalized affinity/repulsion range, according to an embodiment of the invention.

FIG. 4A is a functional diagram 400 illustrating a normalized repulsion/affinity range or "affinity range". As shown in the figure, a range is chosen as a continuum of values between −1, +1. Degrees of affinity or repulsion between nodes are illustrated by probabilitistic values chosen from within the range. One of ordinary skill can appreciate that the system can be designed to utilize any specific range of numeric values. Values of the sub-range 410 −1 through 0 represents grades of repulsion between two elements with −1 representing absolute repulsion. Absolute repulsion indicates that the services and servers on the respective nodes cannot be correlated under any circumstance. For example, a normalized affinity constraint value −1 is assigned to a node that cannot be correlated with another node.

Values in the sub-range 420 0 through +1 represent grades of affinity between two elements with +1 representing absolute affinity. Absolute affinity indicates that the services and servers between the respective nodes must be correlated. For example, if a first node must be associated with another node, then the first node's affinity constraint is assigned the value +1. The zero value is a neutral or natural default value, which means that there is no repulsion or affinity between the two elements. Natural default means that the elements may be correlated at the users' complete discretion. The values −1, +1 are known as "hard" constraints, 0 is the neutral value. All values between the hard constraints represent grades or repulsion or affinity between the two elements, with affinity or repulsion referring to a continuous probability force (or likelihood) according to which mapping of one element onto another element will be computed. These values are known as "soft" constraints. As with the capacity and demand attributes, the relationships among the affinity constraints can be expressed in a matrix. The affinity/repulsion matrix and mapped constraints will be discussed with regards to the generic optimization framework shown in FIG. 6.

Figure 4B:
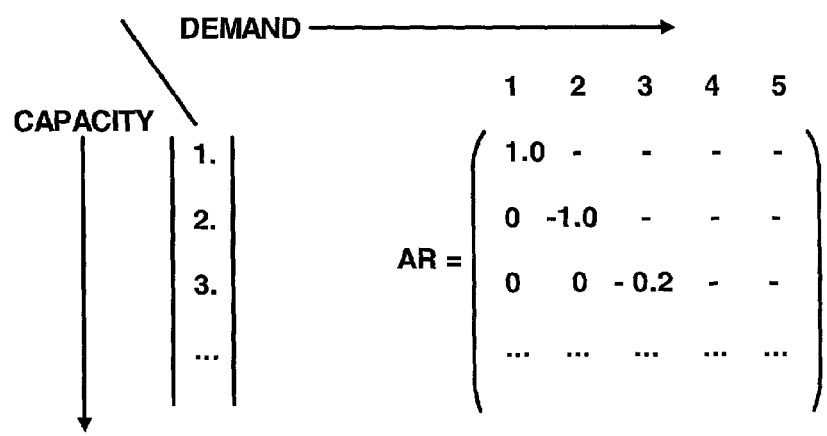
FIG. 4B illustrates an example of an affinity/repulsion matrix, according to an embodiment of the invention.

FIG. 4B is a schematic illustration of an affinity/repulsion matrix 450 (AR in the figure). The affinity/repulsion matrix 450 defines the relationship among elements affinity or repulsion constraints in a compact format. The affinity/repulsion values exist between the elements of the capacity model in one dimension and the elements of the demand model in the other dimension. Columns of the affinity/repulsion matrix 450 represent elements of the capacity model, rows elements, of the matrix 450 of the demand model. For example, in the first row, first column of the matrix, the +1 value indicates an absolute correlation of servers and server between the nodes. The nodes specified as having no preferences are assigned the default value 0.

Affinity and repulsion constraints are then considered for finding accurate solutions for mapping demand, described in a demand model, onto capacity, described by a capacity model. The mapping process (which will be described with regards to FIGS. 5A and 5B) determines which elements from the demand model will be mapped (or placed) onto which elements of the capacity model.

Other non-technical constraints may be taken into account when matching demand with capacity. For example, economic incentives are constraints illustrating fiscal concerns in matching the service with the server. A service may be too expensive to match with a server or matching a service with a server may be particularly profitable. According to one embodiment of the invention, each capacity illustrated in capacity models ($C_p$, $C_s$, $C_t$) and each demand illustrated in demand models ($D_p$, $D_s$, $D_t$) can be described with incentive values or incentive functions ("incentive functions"). The incentive values and functions are taken into account when matching demands and capacities. The optimization framework to determine an economically optimal solution also can use incentive functions.

An incentive value is a constant assigned to one capacity or demand and indicates an economic incentive (for example, cost or price) for consuming one base unit of that capacity. A base unit represents a share or multiple of a capacity or demand of a chosen component for the base unit 1.0 which has been defined. Base units were introduced in "REPRESENTING CAPACITIES AND DEMANDS IN A LAYERED COMPUTING ENVIRONMENT USING NORMALIZED VALUES", by S. Graupner et al., filed on Oct. 26, 2001 and U.S. patent application Ser. No. 10/044,882, which is incorporated herein by reference. Incentive values associated with demand components represent budgets to be spent or allocated when matching with a capacity. Incentive values associated with capacity components represent charges for using the capacity when a demand is mapped onto that capacity. If the budgets are exceeded, respective demands cannot be allocated, and an error is returned for these demands.

Incentive functions represent values, which depend on parameters. Various policies may be implemented using incentive functions. For example, capacity changes tend to rise when the utilization of the capacity rises. As shown by the example, policies can have both real world and control function aspects. The above stated control function represents a policy which will effect how demand is allocated to capacity. Other policies, such as priorities and priority classes, may be expressed by assigning different budgets to demands and different charges to capacities.

Figures 5A, 5B:
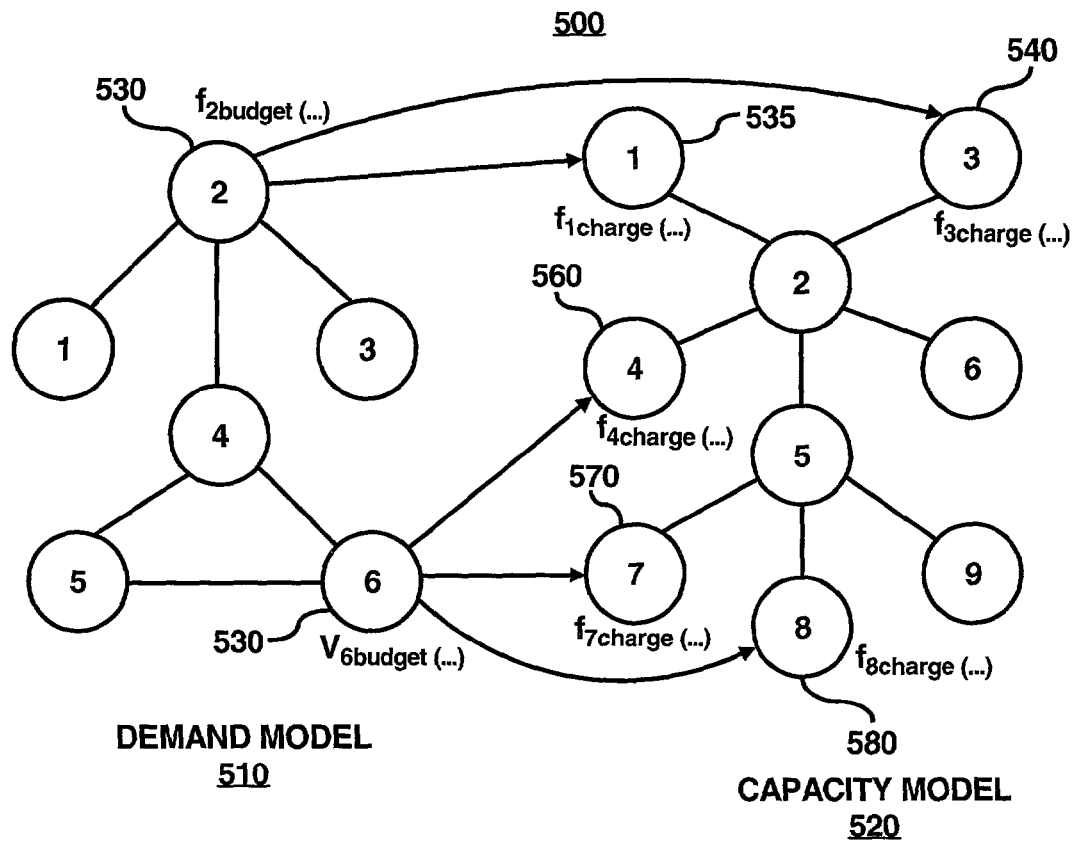
FIG. 5A is a block diagram illustrating an example of matching a capacity model with a demand model using incentive functions and values, according to an embodiment of the invention.
FIG. 5B illustrates an example of associating incentive functions in normalized capacity vectors and matrices with capacity and demand models, according to an embodiment of the invention.

FIG. 5A is a schematic illustration of matching a capacity model with a demand model using incentive functions and values, according to one embodiment of the invention. FIG. 5A shows a simplified view of a demand model 510 matched onto a capacity model 520. According to an embodiment of the invention, mapping is performed by the Optimization Framework, which will be discussed in further detail with regards to FIG. 6.

In the first example illustrated in the FIG. 5A, the demand described by node 2 530 in the demand model 510 can potentially be mapped onto nodes 1 535 and 3 540 in the capacity model 520. Node 2 530 has been assigned a budget function ($f2_{budget}(\ )$). The budget function is used to determine whether the charges of node 1 535 ($f1_{charge}(\ )$) and node 3 530 ($f3_{charge}(\ )$) can be spent or how much capacity can be allocated at node 2 530. Because demand node 2 530 is flexible, it may not allocate all of its demands at a time, therefore allowing for more complex allocation policies than incentive values.

The second example deals with incentive values. The demand described by node 6 550 can be mapped by node 4 (560), node 7 (570) and node 8 (580) of the capacity model 520. The budget of node 6550 is specified by a constant incentive value. Accordingly, only two choices exist: either the budget of node 6550 allows purchasing sufficient capacity from the less-charging capacity nodes 4 (560), 7 (570) and 8 (580) or the charges exceed the budget, and the demand of node 2 cannot be fully satisfied. If this is the case, then node is not further considered for finding optimal matches and will be reported to the optimization engine in order to allow further handling of these demands.

The integration of incentive values and incentive functions into the optimization framework are illustrated in FIG. 5B. FIG. 5B illustrates a pair of vectors and matrix associating incentive values and functions with capacity or demand models 590. One of ordinary skill in the art can recognize that the number of vectors is totally dependent on the user-defined constraints and the number and type of vectors shown in the figure are for illustrative purposes only. The integration of these values is achieved by accompanying each capacity vector/matrix with matching vectors and matrices with incentive values or functions (for example, $I_p$, $I_s$ and $I_t$). However, vectors and matrices are shown as "logical" data structures. One of ordinary skill in the art can recognize that a variety of techniques can be used to optimize implementations.

The incentive values $I_s$ and incentive functions $I_p$ and $I_t$ are arranged in a manner similar to that of the capacity matrix illustrated in FIG. 3B. This example illustrated in FIG. 5B employs vectors to represent the incentive processing and storage attributes and a matrix to represent transport attribute. The incentive processor vector $I_p$, contains the processing incentive functions values, and the incentive storage attribute vector $I_s$, contains the storage incentive functions values. The $I_t$ matrix contains the incentive transport capacity functions.

The first element in $I_p$ indicates that node 1 has an incentive function of fp1( ). Nodes 2, 3 and have associated incentive functions of fp2( ), fp3( ) and fp4( ). The $I_s$ vector illustrates the associated incentive values for the corresponding nodes. The associated incentives between nodes are indicated in matrix It. For example, the associated incentive between node 1 and node 2 is $ft_{11}$( ).

In various embodiments, the invention uses various normalized constraints and preferences as part of the mapping process. The constraints and preferences not only include affinity/repulsion matrices (AR) 450, but also factors indicating economic indicators such as incentive values and incentive functions. These constraints and preferences also play a role in determining mapping process.

In an embodiment of an invention, an optimization framework uses configurable objective functions to generate a mapping or allocation of services in the server infrastructure. The mapping may be evaluated in a framework, such as the System Factory (not shown). The System Factory (not shown) is a computer program, which provides the framework and the integrated environment for the system. Given the model descriptions, a user may use the System Factory to experiment with various scenarios, analyze them, and review the output of the experiments before decisions are made.

The System Factory framework may include three main parts: the distributed model base, the distributed monitoring infrastructure, and the presentation and control consoles. The framework may be distributed in multiple locations and employ various web standards, for example, HTTP or XML for communications. The distributed monitoring infrastructure monitors various parameters in the system, processes this information and extracts the parameters needed for the model descriptions. This keeps the parameters for the model descriptions up to date. The presentation and control consoles displays various model descriptions and parameters to a user, and may permit control functions such as manipulating model descriptions and correlating model descriptions. The System Factory framework was introduced in the article "A FRAMEWORK FOR ANALYZING AND ORGANIZING COMPLEX SYSTEMS", by Sven Graupner et al., which is incorporated by reference. Operating as a software module within the System Factory framework is the Generic Optimization Framework (GOF). GOF is an engine for mapping the service domain model layers onto the server domain model layers.

Figure 6:
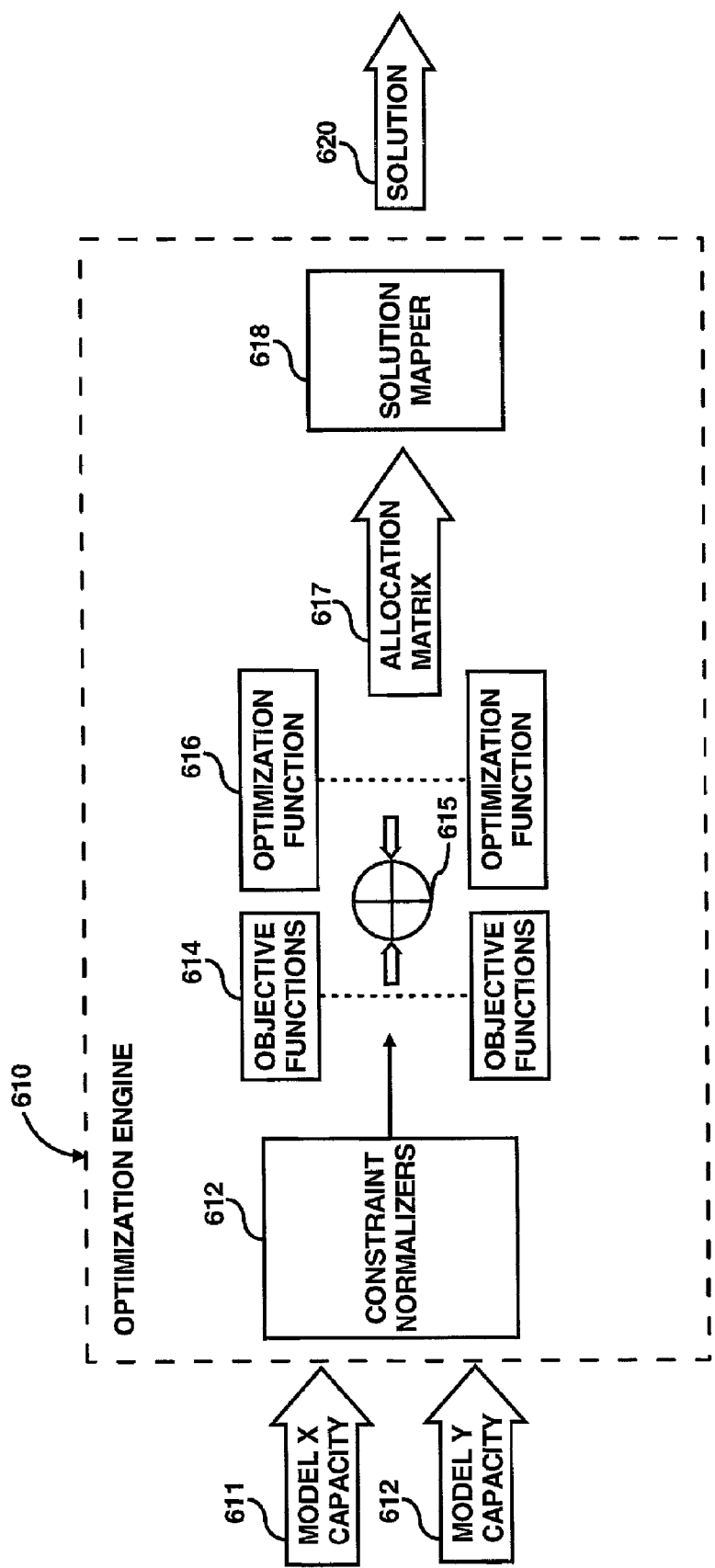
FIG. 6 is a functional block diagram of the Generic Optimization Framework engine, according to an embodiment of the invention.

FIG. 6 is a functional block diagram of the optimization engine 610 in accordance with one embodiment of the invention. The optimization engine 610 comprises model X capacity attributes 610, model Y capacity attributes 611, constraint normalizers 612, objective functions 614, operator 615, optimization functions 616, allocation matrix 617, solution matrix 618 and the solution 620. The optimization engine 610 solves optimization problems, which fall into the known class of general arrangement or mapping problems. The mapping problems are characterized by finding mappings of one set A into another set B by meeting some objective criteria expressed by an objective function and taking constraints into account. The optimization engine 610 receives input demand vectors and capacity vectors which represent the model descriptions of the various model layers from both the service domain 102 and server domain 104 and the normalized constraint values, performs an iterative process to generate an estimated mapping, evaluates the estimated mapping with an objective function and repeats the process until a viable solution is identified.

Optimization engine 610 generates a mapping of components of model x ("demand model") to components of model y ("capacity model") based on the model descriptions of the server demand models x and the model descriptions of the service capacity models y. Constraint normalizers 612, normalized demand, capacity values, incentive values and affinity constraints are used to normalize the model descriptions. The generation of normalized values will be discussed in further detail with regard to FIG. 7B. The optimization engine 610 allows a user to evaluate several different mappings by way of selectable optimization functions 616 and objective functions 614. For example, the optimization function 616 is one of several optimization methods, and an objective function 614 is one of several objective functions. The model descriptions of the demand model and the capacity model are typically represented by a data structure, such as a vector or matrix containing the normalizing values representing the parameters associated with the various nodes that make up the model description. These structures are mathematically operated on by the operator 615 and output to the allocation matrix.

The user provides at least one optimization function 616 and objective function 614, and the optimization engine 610 uses the input optimization function 616 and the objective function 614 in an iterative process, which generates a solution. Examples of optimization functions 616 include generic algorithms and simulated annealing. Examples of objective functions 614 include balancing the processing load on the nodes, balancing traffic between the nodes, and minimizing traffic on selected routes.

Objective functions 614 are defined by the user and translated into code for the optimization engine 610. When an optimization is being performed, the code associated with the objective functions 614 is referenced as a parameter in order for the optimization engine 610 to apply the function. Because code modules for objective functions 614 are parameterizable, optimizations can be performed according to any kind of policy a user desires.

The set of optimization methods 616 and objective functions 614 are orthogonal. Each objective function 614 can be combined with any optimization method. However, different optimization goals may include different sets of input parameters referred to in the objective function 614.

When the optimization method generates an estimated mapping, an allocation matrix 617 is provided to a solution mapper 618. The allocation matrix 617 is a data structure which represents the generated estimated mapping. The allocation matrix 617 indicates which demand-side components (columns) are mapped to which capacity-side components (rows). For example, a binary 1 in cell$_{i,j}$ indicates that component i in the demand model is mapped to component j in the capacity model. The solution mapper 618 translates the allocation matrix 617 into a textual description that identifies the components of the solution 620, for example. In another embodiment, the output of the allocation matrix 617 is translated into control instructions that automate deployment of the various applications and services in the monitored or simulated system.

Normalizers 612 include components that convert capacity, demand values, affinity constraints and incentive values (functions) for specific machines and services into normalized capacity, demand values, affinity constraints and incentive values (functions), as well as components that convert the normalized capacity, demand values, affinity constraints and incentive values (functions) into normalized values for the variables of the objective functions.

Since optimizations follow the same pattern for all model layers, and the capacity and demand attribute values are normalized, the same generic optimization process can be applied. The optimization process will be discussed with greater detail with regards to FIGS. 7A and 7B.

Figure 7A:
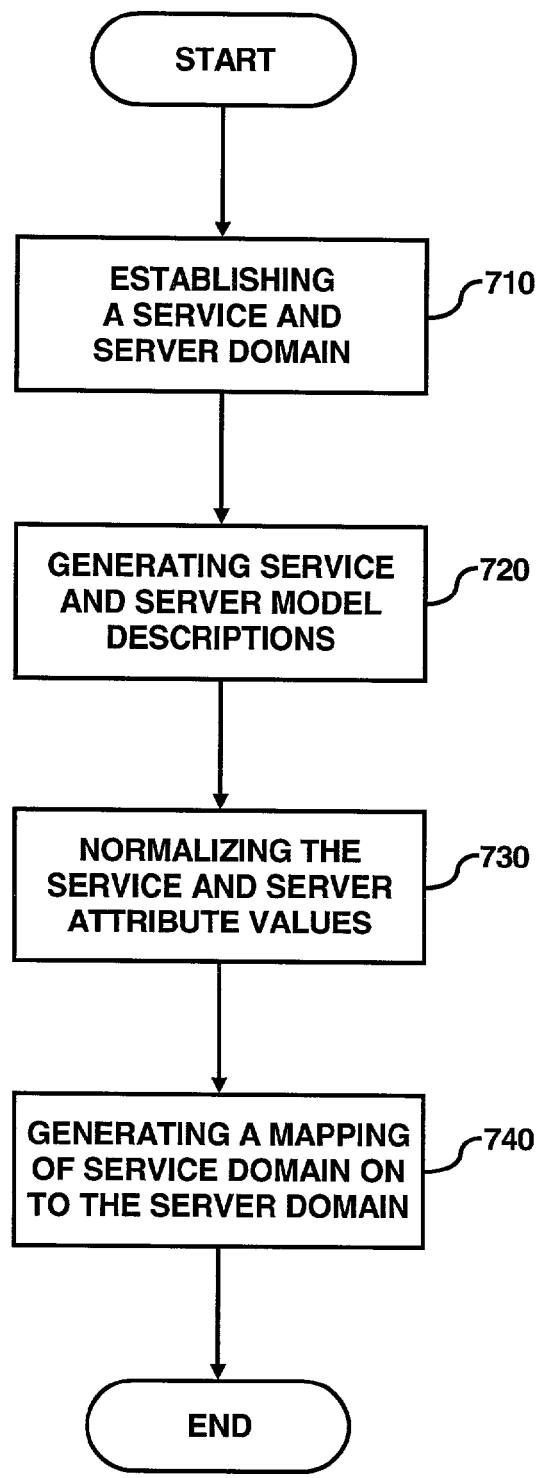
FIG. 7A is a flow-chart illustrating the mapping process, according to an embodiment of the invention.

FIG. 7A is a flowchart describing the steps for mapping the server domain models onto the service domain models, according to an embodiment of the invention. The method 700 includes the following steps: generating server and service models domains 710, generating service and server model descriptions 720, normalizing the set of capacity and demand constraints 730, and generating a mapping of the service domain onto the server domain 704.

In step 710, establishing a service domain 102 includes model layers that may include the services provided by software application(s) and software module(s) and a server domain 104 includes model layers that may include hardware that executes the software applications and modules in the service domain. The model layers are constructs that allow the system to properly characterize the different elements of the computer system.

In step 720, server model descriptions and service model descriptions are generated. As stated above with regards to FIG. 2, the server model descriptions and service model descriptions are represented as a plurality of nodes connected to each other via links. Each of the model layers of the server and services domains are represented by model descriptions. The nodes representing the model layers have associated capacity, demand and constraint attributes. The capacity and demand attributes are illustrated by a number of parameters: processing, storage and transport. The constraint attributes are the relative affinity between a service and a server and incentive functions that illustrate economic considerations. The capacity and demand attributes, and the constraint attributes are considered attribute values. A set of attribute values may exist for the service domain 102 and the server domain 104.

In step 730, the capacity, demand and constraint attribute values are normalized. The normalized attribute values allow the system to generate a baseline that is useful in generating a more accurate representation of the mapping. A normalized value is produced for each capacity, demand, and constraint attribute value, such that the normalized value corresponds to the particular previous value.

In step 740, the method generates a mapping of the model descriptions of the service domain onto the model descriptions of the server domain, using the normalized capacity, demand and constraint attributes. The normalized values are optimized according to an optimization process, which will be discussed with regards to FIG. 7B. The optimization process involves the step of optimizing the capacity and demand values using objective functions 614 and optimization functions 616. The optimized model descriptions are output to an allocation matrix 617. The allocation matrix 617 is a data structure that represents the characteristics of the mapping. The allocation matrix 617 outputs the data to a solution mapper 618. A solution mapper 618 generates the mapping. The mapping includes computer code language representing the layout of services onto servers. The solution mapper 618 translates the allocation matrix 617 into a textual description that identifies the components of the mapping solution.

Figure 7B:
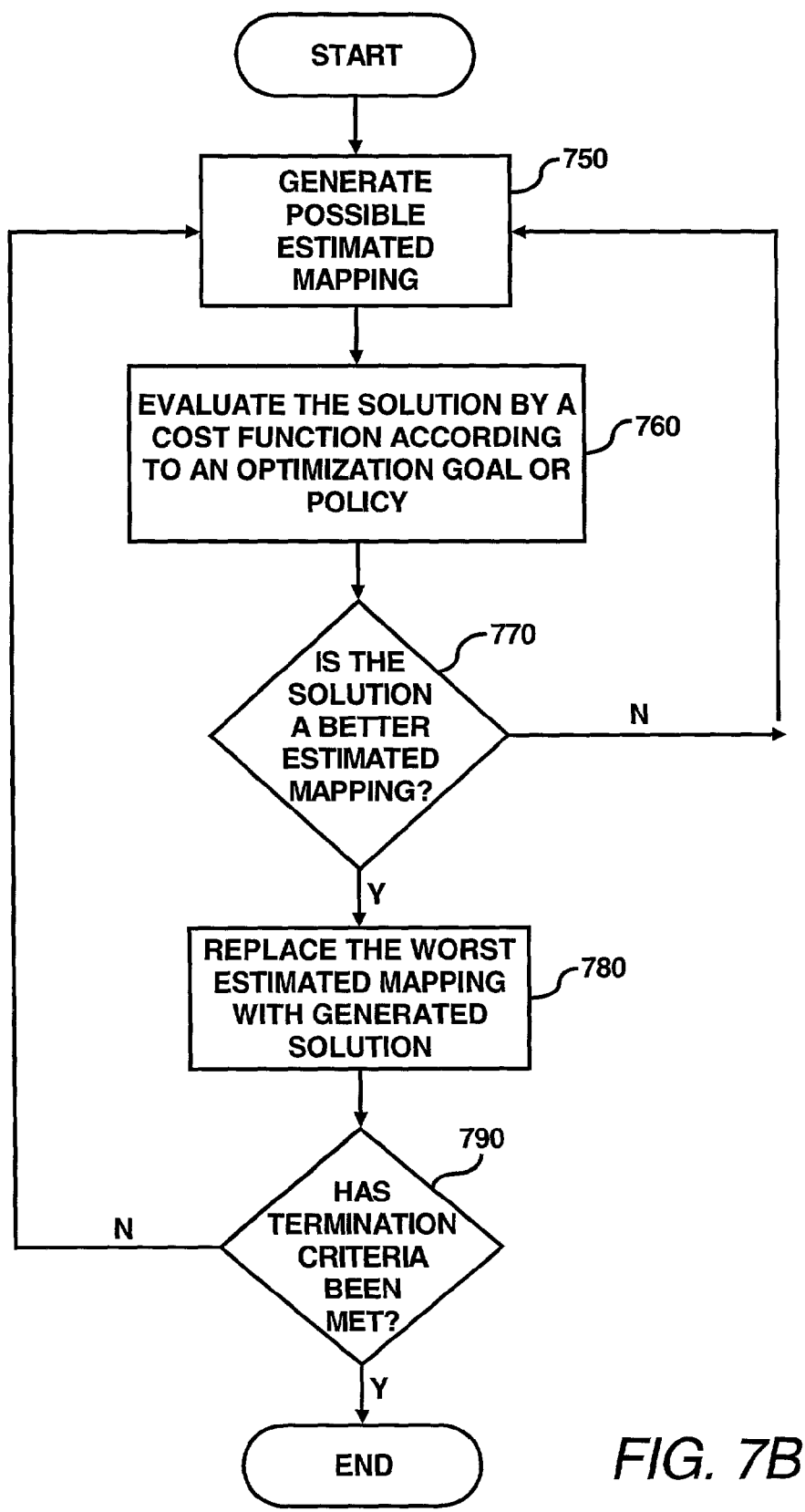
FIG. 7B is a flow-chart illustrating the generic optimization framework, according to an embodiment of the invention.

FIG. 7B is a flowchart illustrating the steps of optimizing the demand and capacity values in order to generate a mapping of services onto servers. The steps include generating a estimated mapping 750, evaluating an estimated mapping 760, determining the quality of the estimated mapping 780, replacing the estimated mapping with the generated solution, and determining whether a termination criteria has been met 790.

In step 750, the method generates an estimated mapping. The method takes a random mapping of services on servers and generates a possible estimated mapping. This step is performed using the optimization engine 610. The relationships defined by the affinity (AR) matrix 450 are input into the optimization engine 610 in order to map the capacities with the demands. Preferences, constraints and possible incentive functions and values are used to normalize the parameters, as referred to with regards to FIG. 6. The affinity constraints and incentive functions will become part of the solution pool from which the optimal estimated mapping finally will be chosen at the end of the iteration process. Pairs with total affinity (+1.0 values) or total repulsion (−1.0 values) are considered as partial, a priori estimated mappings. Accordingly, estimated mappings with all total affinity relationships met will be generated and will be considered further. Neutral values (0 value) are ignored at the stage of estimated mapping generation. The remaining affinity values (−1.0>value>+1.0 and value<>0) are considered "soft" weights for the estimated mapping generator. Estimated mappings are associated with probabilities, such that estimated mappings with closer affinity values appear in the solution pool with higher probability. These rules accelerate optimizations and tend to improve the quality of the estimated mappings.

In step 760, the method evaluates the estimated mapping by a cost function according to an optimization goal or policy. The cost function evaluates the quality of estimated mappings in the solution pool. The cost function is typically an objective function, which defines the optimization goal. The optimization goal can be a condition defined by the user, e.g. loading a Local Area Network (LAN) in a particular manner, minimizing traffic, etc. Affinity values are also considered in this stage. Each generated estimated mapping is checked to determine whether it is in the predefined constraints. If it is not within the affinity constraints then the estimated mapping is ignored, and the method generates a new estimated mapping in step 750.

In step 770, the estimated mapping is checked to determine whether the estimated mapping is "better" or more accurate in accordance with a user's tolerance than the prior estimated mapping by the lower cost value. The estimated mapping is evaluated and a value is assigned to the estimated mapping. The value indicates how the estimated mapping relates to the cost function. A "better" or more accurate estimated mapping is reflected by a larger associated value.

In step 780, the estimated mapping replaces the least accurate estimated mapping in the solution pool, if the generated estimated mapping is perceived to be more accurate than the prior estimated mappings. The estimated mapping and the associated value is input into a solution pool. A solution pool is a set of possible estimated mappings. Estimated mappings with higher associated values replace estimated mappings with lower associated values in the solution pool.

In step 790, repeat the process until some termination criteria applies. The termination criteria are user-defined criteria that when it is met, the process ceases. For example, when the last 50 estimated mappings have a value that indicates it is a very good estimated mapping and have replaced 50 estimated mappings in the solution pool. Once the termination criteria have been met, the estimated mappings in the solution pool are implemented by the user as a blueprint for the allocation of servers and services. The estimated mapping is passed complied in the allocation matrix 616 and sent to the solution mapper 617.

What has been described and illustrated herein is the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for generating automated mappings of service demands to server capacities in a distributed computer system, including a plurality of server and service nodes, the method comprising the steps of;
   establishing at least one server model layer, said at least one server model layer including a set of server attribute values associated with the plurality of server nodes;
   establishing at least one service model layer, said at least one service model layer including a set of service attribute values associated with the plurality of service nodes,
      wherein the server attribute values and the service attribute values include capacity and demand attribute values, affinity and incentive constraints,
      wherein the affinity constraints includes a continuum of values over a predetermined interval, such that there is an upper limit of the interval which represents absolute affinity and a lower limit of the interval which represents absolute repulsion,
      wherein the incentive constraints include incentive functions, such that incentive functions arc associated with non-technical considerations;
   normalizing each set of server attribute values and service attribute values; and
   generating a mapping of service nodes onto server nodes, using the normalized capacity attribute values and normalized demand attribute values.

2. The method of claim 1, wherein the method further comprises the steps of:
   establishing a plurality of server model descriptions, such that the plurality of server model descriptions includes said plurality of server nodes; and
   establishing a plurality of service model descriptions, such that the plurality of service model descriptions includes said plurality of service nodes.

3. The method of claim 1, wherein the method further comprises the steps of:
   establishing a server domain which includes a plurality of server model layers, such that the server domain illustrates model layers that may include the services provided by software applications and software modules; and
   establishing a service domain which includes a plurality of service model layers, such that the service model illustrates model layers that may include hardware that executes the software applications and modules in the service domain.

4. The method of claim 1, wherein the server nodes and service nodes include data structures, and the server nodes and service nodes illustrate the constituent elements of an individual model layer.

5. The method of claim 1, further comprising the step of:
   performing a generic optimization process in order to produce an optimized mapping.

6. A method for allocating computing resources in a distributed computer system having a plurality of computing machines that host a plurality of application processes, the method comprising the steps of:
   establishing at least one server model description, such that said at least one server model description includes data structures, and further includes a set of server attribute values for the plurality of server nodes;
   establishing at least one service model description, such that said at least one service model description includes data structures, and further includes a set of service attribute values for the plurality of service nodes;
   normalizing each of the associated sets of service and server attribute values by generating at least one value for each service and server attribute value, which represents an association between the plurality of service and server nodes; and
   generating an optimized mapping of service nodes to server nodes.

7. The method according to claim 6, further comprising a service domain which includes a plurality of service model descriptions, describes the services provided by a software application and a software component that provides computing services and the server domain which includes a plurality of server model descriptions, describes the hardware that executes the software components in the service domain.

8. The method according to claim 6, wherein the server and service attribute values comprise a set of capacity and demand attributes values, affinity values and incentive functions, representing non-technical factors, and affinity values, which represent the degree of association between nodes.

9. The method according to claim 8, wherein the incentive value includes a constant value indicating the price of consuming one base unit of capacity and the incentive functions include variables which depend on parameters.

10. The method according to claim 8, wherein the affinity values include a continuum of values over a predetermined interval, such that there is an upper limit of the interval which represents absolute affinity and a lower limit of the interval which represents absolute repulsion.

11. The method according to claim 6, wherein the step of generating an optimized mapping further comprises the step of:
   performing a generic optimization process to generate the optimized mapping, such that the generic optimization process takes into account constraints in the the of affinity-repulsion values and incentive values and functions.

12. The method according to claim 11, wherein the step of performing further comprises the steps of:
   generating a estimated mapping based on a random mapping;
   evaluating the estimated mapping according to the normalized constraints and a cost function;
   replacing the estimated mapping with a poorer quality solution in a solution pool; and
   repeating the steps until a predetermined termination criteria is met.

13. An apparatus for optimizing allocation of computer resources comprising:
   server modeling means for generating a plurality of server nodes, wherein each of the plurality of server nodes has an associated set of server attribute values;

service modeling means for generating a plurality of service nodes, wherein each of the plurality of service nodes has an associated set of service attribute values;

normalizing means for normalizing the associated sets of server and service attribute values by generating at least one normalized value for each server and service attribute value, such that the normalized varies describe predetermined relationships between the plurality of server and service nodes;

optimizing means for optimizing the normalized server and service attribute values in accordance with an objective function and an optimization function; and mapping means for generating an optimized mapping of the demand model onto the capacity model.

14. The apparatus according to claim 13, wherein the server and service attribute values comprise capacity and demand constraints, incentive functions.

15. The apparatus according to claim 14, wherein the affinity values are a continuum of values over a predetermined interval, such that there is an upper limit of the interval which represents absolute affinity and a lower limit of the interval which represents absolute repulsion, and the incentive functions represent non-technical considerations.

16. The apparatus according to claim 14, wherein the affinity values are represented in an affinity/repulsion matrix and the incentive functions are represented as an incentive matrix.

17. The method according to claim 14, wherein the incentive functions indicate the price of consuming one base unit of capacity.

18. The apparatus according to claim 13, wherein the optimizing means includes means for performing a generic optimization process to generate on optimized mapping.

19. The apparatus according to claim 18, wherein the optimizing means further comprises:

selecting means for selecting one of a plurality of objective functions, wherein each of the plurality of the objective functions evaluates a solution as function of the demand and capacity attributes and formalized constraints.

20. The apparatus according to claim 18, wherein the optimizing means further comprises the steps of:

means for generating an estimated mapping based on a random mapping;

means for evaluating the estimated mapping according to the formalized constraints and a cost function;

mains for replacing the estimated mapping with a poorer quality solution in a solution pool; and means for repeating the steps until a predetermined termination criteria is met.

21. A computer readable storage medium on which is embedded one or more computer programs, said one or more computer programs implementing a method for generating automated mappings of service demands to server capacities in a distributed computer system, including a plurality of server and service nodes, said one or more computer programs comprising a set of instructions for:

establishing at least one server model layer, said an least one server model layer including a set of server attribute values associated with the plurality of server nodes;

establishing at least one service model layer, said at least one service model layer including a set of service attribute values associated with the plurality of service nodes, wherein the server attribute values and the service attribute values include capacity and demand attribute values, affinity and incentive constraints, wherein the affinity constraints includes a continuum of values over a predetermined interval, such that there is an upper limit of the interval which represents absolute affinity and a lower limit of the interval which represents absolute repulsion, wherein the incentive constants include incentive functions, such that incentive functions are associated with non-technical considerations;

normalizing each set of server attribute values and service attribute values; and generating a mapping of services nodes onto server nodes, using the normalized capacity attribute values and normalized demand attribute values.

22. The computer readable storage medium according to claim 21, said one or more computer programs comprising a set of instructions for:

establishing a plurality of server model descriptions, such that the plurality of server model descriptions includes said plurality of server nodes; and establishing a plurality of service model descriptions, such that the plurality of service model descriptions includes said plurality of service nodes.

23. The computer readable storage medium according to claim 21, said one or more computer programs comprising a set of instructions for:

establishing a server domain which includes a plurality of server model layers, such that the saver domain illustrates model layers that may include the services provided by software applications and software modules; and establishing a service domain which includes a plurality of service model layers, such that the service model illustrates model layers that may include hardware that executes the software applications and modules in the service domain.

24. The computer readable storage medium according to claim 21, wherein the server nodes and service nodes include data structures, and the server nodes and service nodes illustrate the constituent elements of an individual model layer.

25. The computer readable storage medium according to claim 21, said one or more computer programs comprising a set of instructions for:

performing a generic optimization process in order to produce an optimized mapping.

* * * * *

UNITED STATES PATENT AND TRADEMARK OFFICE
CERTIFICATE OF CORRECTION

| | | |
|---|---|---|
| PATENT NO. | : 7,072,960 B2 | Page 1 of 1 |
| APPLICATION NO. | : 10/164554 | |
| DATED | : July 4, 2006 | |
| INVENTOR(S) | : Sven Graupner et al. | |

It is certified that error appears in the above-identified patent and that said Letters Patent is hereby corrected as shown below:

In column 16, line 27, in Claim 7, delete "services" and insert -- services; --, therefor.

In column 16, line 50, in Claim 11, after "in the" delete "the" and insert -- form --, therefor.

In column 17, line 7, in Claim 13, delete "varies" and insert -- values --, therefor.

In column 17, line 47, in Claim 20, delete "mains" and insert -- means --, therefor.

In column 17, line 58, in Claim 21, delete "an" and insert -- at --, therefor.

In column 18, line 15, in Claim 21, delete "constants" and insert -- constraints --, therefor.

In column 18, line 21, in Claim 21, delete "services" and insert -- service --, therefor.

In column 18, line 39, in Claim 23, delete "saver" and insert -- server --, therefor.

Signed and Sealed this

Thirtieth Day of March, 2010

David J. Kappos
*Director of the United States Patent and Trademark Office*